US006047856A

United States Patent [19]

Meshberg et al.

[11] Patent Number: 6,047,856

[45] Date of Patent: Apr. 11, 2000

[54] DISPENSING PUMP WITH PRIMING FEATURE

[75] Inventors: Emil Meshberg, Farfield; Philip Miller, North Haven; Robert Schultz, Old Greenwich, all of Conn.

[73] Assignee: Emson, Inc., Stratford, Conn.

[ * ] Notice: This patent is subject to a terminal disclaimer.

[21] Appl. No.: 08/995,661

[22] Filed: Dec. 22, 1997

Related U.S. Application Data

[63] Continuation of application No. 08/493,231, Jun. 20, 1995, Pat. No. 5,702,031.

[51] Int. Cl.[7] .................................................. G01F 11/00

[52] U.S. Cl. .......................... 222/1; 222/321.2; 239/333; 239/373

[58] Field of Search ......................... 222/1, 321.2, 321.9, 222/341; 239/1, 333, 347, 373

[56] References Cited

U.S. PATENT DOCUMENTS

| | | | |
|---|---|---|---|
| 3,746,260 | 7/1973 | Boris | 222/321 |
| 3,774,849 | 11/1973 | Boris | 239/338 |
| 4,050,613 | 9/1977 | Corsette | 222/321.2 |
| 4,051,983 | 10/1977 | Anderson | 222/321 |
| 4,144,987 | 3/1979 | Kishi | 222/321 |
| 4,317,531 | 3/1982 | Saito et al. | 222/321 |
| 4,365,729 | 12/1982 | Saito et al. | 222/321 |
| 4,402,432 | 9/1983 | Corsette | 222/321 |
| 4,437,588 | 3/1984 | Shay | 222/321 |
| 4,530,449 | 7/1985 | Nozawa et al. | 222/189 |
| 4,821,928 | 4/1989 | Su | 222/321.2 |
| 4,923,094 | 5/1990 | O'Neill | 222/321 |
| 5,064,105 | 11/1991 | Montaner | 222/321 |
| 5,358,149 | 10/1994 | O'Neill | 222/321.2 |
| 5,702,031 | 12/1997 | Meshberg et al. | 222/1 |

FOREIGN PATENT DOCUMENTS

| | | |
|---|---|---|
| 0 295 767 | 12/1988 | European Pat. Off. . |
| 0 316 167B1 | 5/1989 | European Pat. Off. . |
| 0 346 167 | 12/1989 | European Pat. Off. . |
| 0 453 387 | 10/1991 | European Pat. Off. . |

*Primary Examiner*—Joseph A. Kaufman
*Attorney, Agent, or Firm*—Kenyon & Kenyon

[57] ABSTRACT

The present invention relates to a precompression pump with a feature to evacuate air trapped in the pump chamber to thereby assist in priming the pump. In particular, the present invention relates to a precompression pump which uses mechanisms to create gaps of very small size to bridge two seals on a pump piston, in a way that the small size of the gaps allows the passage of trapped air, but because of the viscosity of any liquid in the pump chamber does not allow the passage of liquid past the seals on the pump piston. Flats which define a chord of the inner circumference of the cylinder wall can be used to create the appropriate gaps. In addition, the core creating the inner circumference can be photochemically etched to provide a roughened surface with asperities which create the appropriate gaps. The priming mechanisms preferably create air gaps around both seals of the pump piston.

13 Claims, 3 Drawing Sheets

DISPENSING PUMP WITH PRIMING FEATURE

This application is a continuation of U.S. patent application Ser. No. 08/493,231, filed Jun. 20, 1995, now U.S. Pat. No. 5,702,031, issued Dec. 30, 1997.

BACKGROUND OF THE INVENTION

1. Field of the Invention

The present invention relates to a precompression pump with a feature to evacuate air trapped in the pump chamber to thereby assist in priming the pump. In particular, the present invention relates to a precompression pump which uses mechanisms to create gaps of very small size to bridge two seals on a pump piston, in a way that the small size of the gaps allows the passage of trapped air, but because of the viscosity of any liquid in the pump chamber does not allow the passage of liquid past the seals on the pump piston.

2. Description of the Prior Art

A number of different patents describe precompression pumps with mechanisms for evacuating air from the pump chamber to assist in priming of the pump. For example, U.S. Pat. Nos. 3,746,260; 3,774,849; 4,051,983; 4,144,987; 4,317,531; 4,365,729; 4,437,588; 4,530,449; 5,064,105 and European Patent No. 0 346 167 all show mechanical mechanisms in the form of projections or grooves, which create a passage around a single seal of a pump piston or valve seal to thereby create a passage for fluid to exit the pump chamber.

Difficulties have been encountered in precompression pumps using priming features of the prior art. For example, priming features which exhaust the air and/or liquid in the pump chamber past the inlet valve, as in, e.g., U.S. Pat. Nos. 4,051,983; 4,144,987; and 4,437,588. can result in air remaining in the dip tube below the inlet valve. A result of this arrangement is that undesirable variations in dosage size can result because the pump chamber does not fill with liquid but instead with a liquid-air mixture. Furthermore, priming features which exhaust the air and/or liquid in the pump chamber past the pump piston, as in, e.g., U.S. Pat. Nos. 3,774,849; 4,317,531; 4,3365,729; 4,530,449; 5,064,105; and E.P.O. Patent No. 0 346 167, often will leave residue in the area above the pump piston lower seal, which residue can clog or impede pump performance. In addition, these priming arrangements around the pump piston often require that an exhaust port be provided through the pump chamber sidewall between the top and bottom pump piston seals. This exhaust port can be difficult to mold and can impede the range of motion or designs available for the pump piston.

The prior art priming arrangement are generally of a relatively large size in comparison to the size of the piston and cylinder diameters, such that a single groove or projection provides a passage of a sufficiently large area for exhausting compressed air from the pump chamber. Such large priming arrangements can cause undesirably large deflections of the seal being bridged, resulting in scoring or fatigue in the portion of the seal immediately adjacent the projection or groove. As a result, the pump can have a reduced lifetime or reduced effectiveness over a long lifetime.

SUMMARY OF THE INVENTION

It is an object of the present invention to provide a priming feature for a precompression pump which eliminates many of the problems of prior art priming features. In the present invention, priming is accomplished by providing a pair of priming features, one for bridging each of the top and bottom seals of the pump piston. The priming features are structured so as to create a plurality of very small sized gaps or passages around the pump piston seals. As a result, air will pass through the passages, while liquid will be prevented from passing through the passages because of the viscosity and surface tension characteristics of the liquid.

The priming features of the present invention can be formed in several different ways. In one embodiment, the priming feature is formed by a series of flats around the inner circumference of the pump chamber wall, which form flats having a surface forming a chord of the inner circumference of the pump chamber wall. Directly adjacent the axially-inwardmost flats can be located slots for assisting the passage of air past the pump piston lower seal. The priming feature of the present invention can also be formed by a roughened surface on the inner circumference of the pump chamber made by of photochemically etching the core used to mold the pump cylinder. This embodiment can also include slots for assisting the passage of air past the pump piston lower seal. These priming features can be used in combination with one another, or in combination with other priming features. In both embodiments, a plurality of gaps are created for passage of air around each pump piston seal. The small size of these gaps allows air to pass through the individual gaps, but prevents or reduces the ability of liquid to pass through the individual gaps because of the viscosity and surface tension of the liquid.

DETAILED DESCRIPTION

Figure 1:
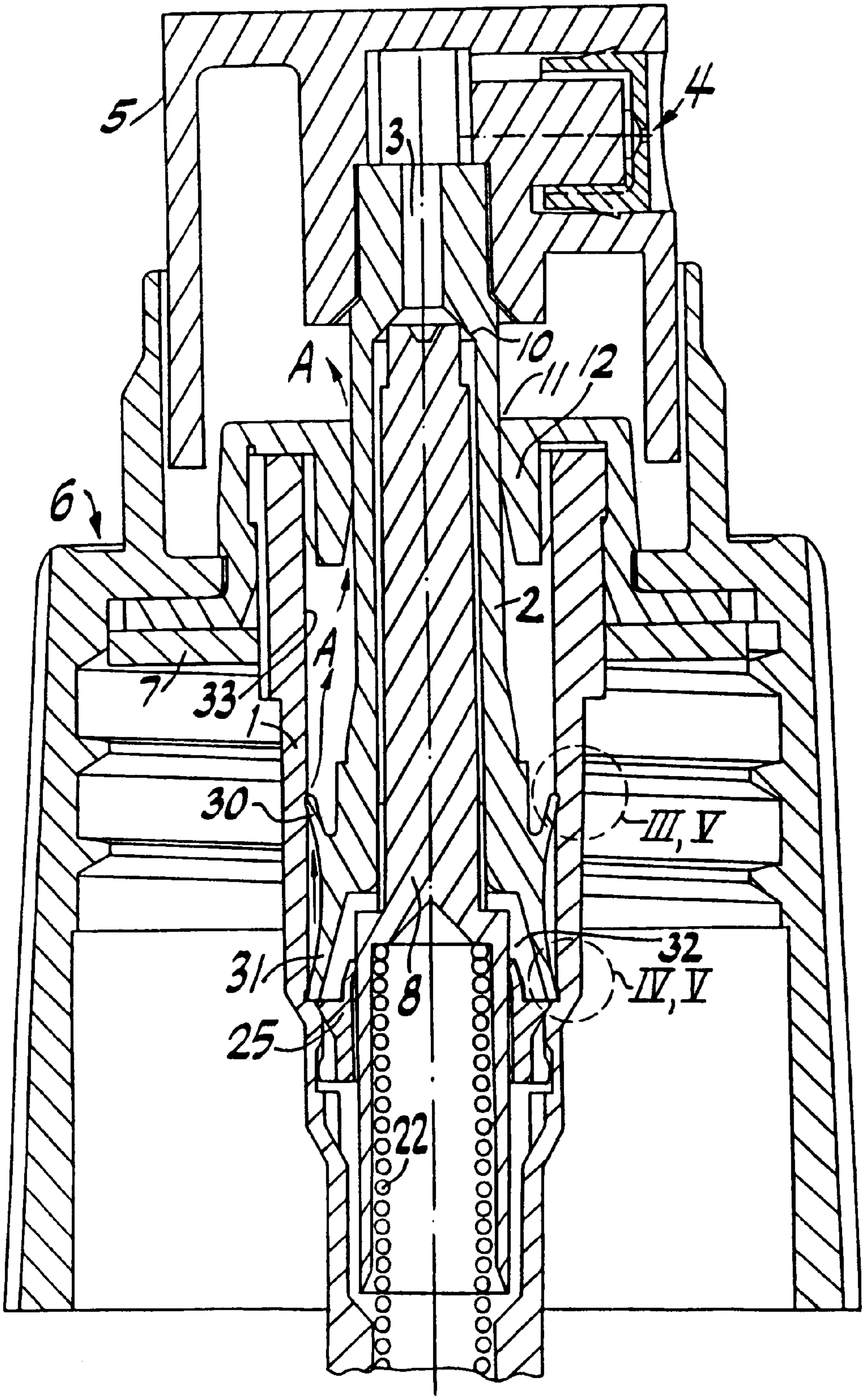
FIG. 1 shows an cross-sectional, side assembly view of a pump of the present invention including the priming feature of the present invention.

FIG. 1 shows a first embodiment of the pump including a priming feature of the present invention. The pump is generally of the type shown and described in U.S. Pat. No. 5,277,559. The pump includes a cylinder 1, in which a pump piston 2 slides. Pump piston 2 includes an outlet passage 3 which leads to the atomizing nozzle 4. Atomizing nozzle 4 is housed on an actuator assembly 5. The cylinder 1 can be mounted on a container or bottle (not shown) by means of a mounting cap 6, which can include a suitable sealing device 7. A passage 11 for air to exit the pump and to enter the container is created between the pump piston 2 and a wall 12 of the mounting cap 6.

Contained within the cylinder 1 is a valve stem 8. Valve stem 8 includes an upper end which seats against a valve seat surface 10 on the pump piston 2, and a lower portion. A spring 22 biases the stem 8 axially-outwardly into engagement with the valve seat 10. The valve stem 8 is constructed such that there is an axially-outward facing net surface area within the pump chamber 32 after the inlet valve is closed, thereby allowing the outlet valve 8, 10 to open only when sufficient pressure is generated within the pump chamber 32. A sliding inlet seal 25 opens and closes the inlet to the pump chamber 32 within pump cylinder 1, thereby allowing liquid to fill the pump chamber during an upstroke of the pump piston 2, and thereby closing off the inlet to the pump chamber 32 during a downstroke of the pump piston 2.

At an axially-inwardmost position of the pump piston 2. as shown in FIG. 1, priming features 40, 41 (shown in detail in FIGS. 2–5) create gaps or passages around the top 30 and bottom 31 seals of pump piston 2, to thereby allow compressed air to exit the pump chamber 32 through the passage 11 in the path indicated by the arrows A. As is described hereinbelow, priming features 40, 41 create small gaps or passages G through which air. but not liquid, can escape between top 30 and bottom 31 seals of pump piston 2 and the inner wall 33 of cylinder 1.

Figure 2:
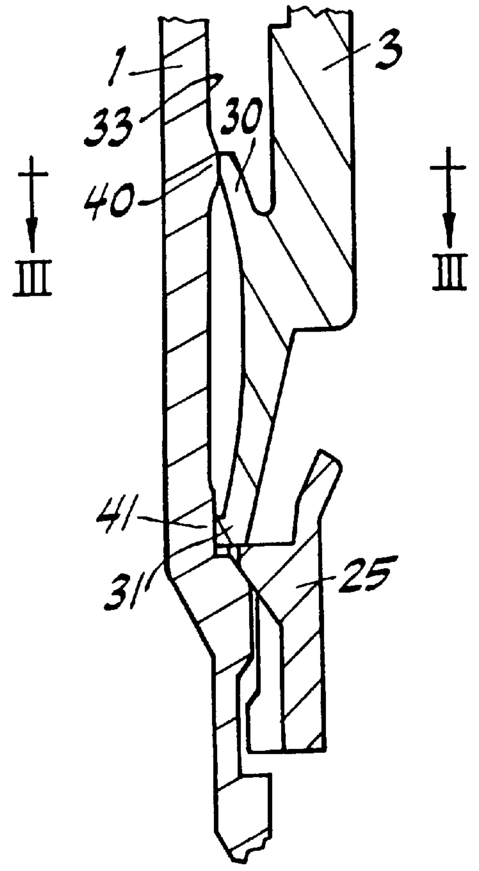
FIG. 2 shows a cross-sectional, side detail view of the pump piston seals of the present invention interacting with a first embodiment of the priming feature of the present invention.

FIG. 2 shows a cross-sectional side view of the interaction of a first embodiment of the priming features 40, 41 of the present invention and the top 30 and bottom 31 seals of the pump piston 2 of the present invention. The size of the priming features 40, 41 shown in FIG. 2 is exaggerated for ease of explanation. Top 40 and bottom 41 priming features are located at axial positions along inner wall 33 of cylinder 1 such that they interact with top 30 and bottom 31 seals of the pump piston 2 at the axially-inwardmost position of the downstroke of pump piston 2.

Figure 4:
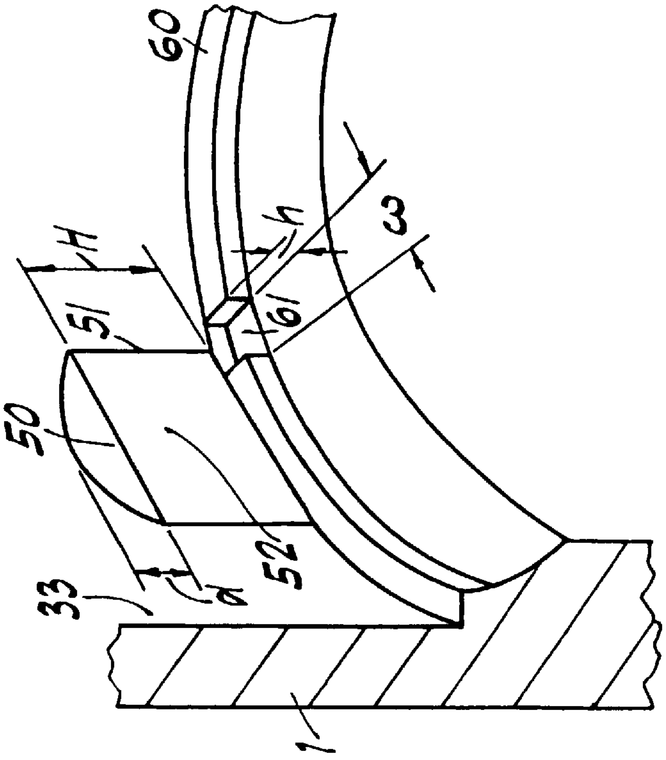
FIG. 4 shows a perspective view of the bottom priming feature of the first embodiment of the present invention.
Figure 3:
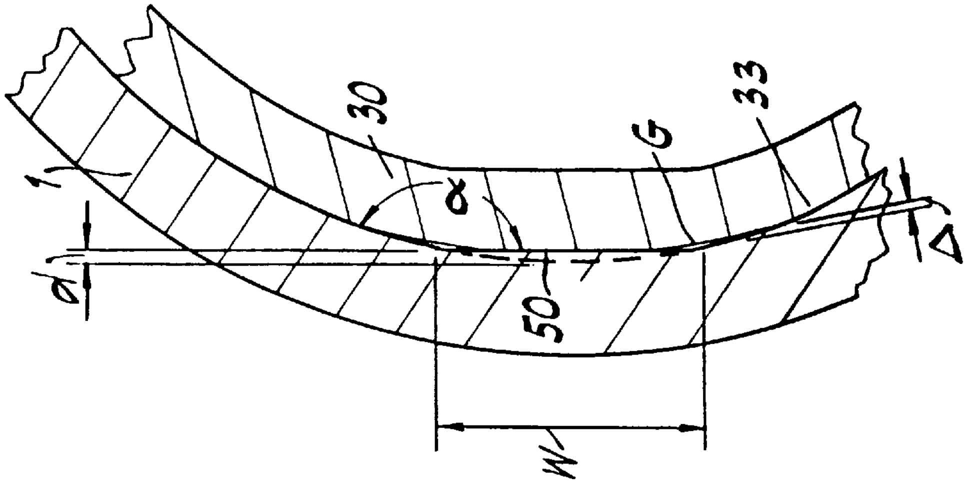
FIG. 3 shows a cross-sectional, top detail view of the pump piston seal interacting with a first embodiment of the priming feature of the present invention.

FIG. 3 shows a detail cross-sectional top view of a flat 50 used as part of the priming features 40, 41 of the first embodiment of the present invention. The flat 50 is a flattened section along the circumference of the inner wall 33 of the cylinder 1 which projects into the pump chamber 32 slightly beyond the location of the inner wall 33 of the cylinder 1. For example, in a pump having a inner wall 33 diameter of 0.300 inches, the flat 50 could be approximately 0.024 inches in width W and 0.0005 to 0.001 inches in depth d, as measured between a line tangent to the inner wall 33 of cylinder 1, and parallel to the flat surface 52, and the flat surface 52. As a result, a ratio R of flat depth d to inner wall 33 diameter can be approximately 1:600 to 1:300. The gaps G accordingly have a depth A of no greater than approximately 0.001 inches. As shown in FIG. 4, the flat 50 has a height H. which can be between 0.020 and 0.060 inches. The smaller the depth d. the smaller the size of the gaps G. and as a result the height H must be greater to ensure sufficient time to exhaust all trapped air from pump chamber 32. For a flat 50 depth d of 0.0005 inches, a height H of approximately 0.060 inches is desirable; for a flat 50 depth d of 0.001 inches a height H of approximately 0.040 inches is desirable. The flat 50 includes a flat surface 52 which defines a chord of the inner wall 33 of the cylinder 1. The flat 50 creates gaps G on either side of the flat 50. adjacent the edges 51 of the flat 50.

The axially inward or bottom end of lower priming features 41, in the form of flats 50. can contact the piston stop 60 of the cylinder 1. A venting recess 61 is located in piston stop 60 and is situated directly below at least one edge 51 of the flat 50. This location of venting recess 61 ensures a direct venting path to the gap created between the lower pump piston seal 31 and the cylinder wall 33 from the interior of the pressure chamber 32. In a preferred first embodiment of the present invention, two upper flats 50 are used to exhaust air around the upper seal 30 of the pump piston 2, and four to eight lower flats 50 are used to exhaust air around the lower seal 31 of the pump piston 2. Eight venting recesses 61 are used to ensure passage of compressed air to the gaps G created by the lower flats 50. The venting 61 recesses preferably have a width w of between 0.010 and 0.020 inches, and a height h of between 0.002 and 0.005 inches.

The flats 50 create approximately triangular venting gaps G which have one obtuse angle a of approximately 162°. This angle ensures that the pump piston seals 30, 31 are not deformed through any sharp angles, thereby eliminating any problems of premature excessive wear, scoring, or fatigue of the piston seals 30, 31 caused by deformation of the piston seals 30, 31 by the priming mechanisms 40, 41. Furthermore, this gap G configuration ensures that the air passage gaps G are of a sufficiently small size that liquid viscosity and surface tension will prevent any liquid from passing through the gaps G, but air may freely pass through the gaps G. It is desirable to provide several of the flats 50 to ensure that the cumulative size of the gaps G created by the flats 50 is sufficient to vent a large enough volume of air from the pump chamber 32 once the gaps G are opened to clear the pump chamber 32 of compressed air. For example, two flats 50 are preferably used as the priming mechanism 40 for bypassing pump piston 2 upper seal 30, thereby creating four gaps G (one on either side of each of the two flats 50). As a result, air can be successfully evacuated from the pump chamber 32, while liquids are not passed through the gaps G to potentially hinder performance or cause dosage size variations. The upper 40 and lower 41 priming mechanisms create a path A for the passage of air from the interior of the pressure chamber 32 around both of the piston seals 30, 31 and out of the cylinder 1, when the piston 3 is at the bottom of its stroke. Compressed air is therefore expelled from the pump chamber 32 at the bottom of the pump stroke.

Figure 5:
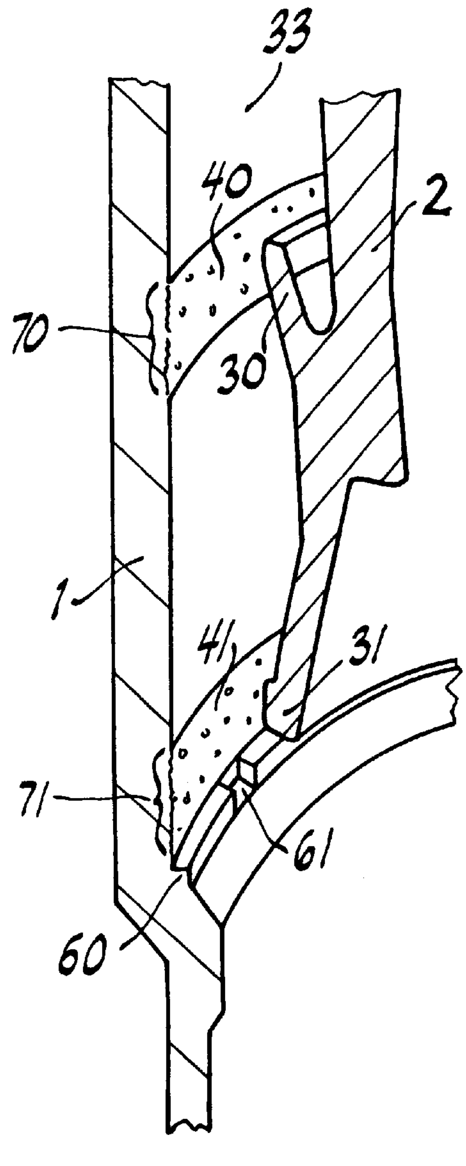
FIG. 5 shows a perspective view of the priming feature of a second embodiment of the present invention.

FIG. 5 shows a second embodiment of the priming mechanisms 40, 41 of the present invention. In the embodiment of FIG. 5. the flats 50 of the embodiment of FIGS. 2–4 are replaced with areas 70, 71 which are roughened surfaces. The surface of the mold core which creates the inner surface 33 of the cylinder 1 is photochemically etched to produce the roughened surfaces. The photochemical etching creates roughened surfaces with asperities in the form of protrusions and/or indentations which range in height and/or depth from 0.001 to 0.0002 inches. These protrusions and/or indentations create very small gaps between the piston seals 30, 31 and the inner wall 33 of the cylinder 1—which inner wall 33 can have a diameter of approximately 0.300 inches—for the passage of air between the inner wall 33 of the cylinder 1 and the piston seals 30, 31. As a result, the ratio R of asperity height/depth to inner wall 33 diameter can be approximately 1:1500 to 1:300. Compressed air in the pump chamber 32 passes through these gaps G, thereby bypassing the seals 30, 31 and exhausting any trapped air from the pump chamber 32. The size of the gaps G is such that the surface tension and viscosity of any fluid within the pump chamber prevents the liquid from exiting the pump chamber 32 via the gaps G, and the gaps G do not exceed a depth of approximately 0.001 inches. As with the embodiment of FIGS. 2–4, a venting recess 61 is used to allow air to pass through the piston stop 60 at the axially-inner end of the pump chamber 32.

The present invention contemplates a number of different variations on the above-described preferred embodiment. It is to be understood that the above description is only of preferred embodiments, and that other pump designs may be used with the present invention, as well as other designs of the priming mechanisms. The scope of the invention is to be measured by the claims as set forth below.

We claim:

1. A dispensing pump comprising:

a cylinder, said cylinder comprising an inner wall;

a piston reciprocally mounted in said cylinder, said piston comprising at least one seal sealing against said inner wall, said piston reciprocating in said cylinder from a first, axially outward, position to a second, axially inward, position; and at least one priming mechanism on said cylinder inner wall, said at least one priming mechanism being located at a location of said at least one seal on said inner wall at said second position of said piston, said priming mechanism creating at least one gap between said at least one seal and said inner wall, said at least one gap having a depth of no greater than approximately 0.001 inches.

2. The dispensing pump of claim 1, wherein:

said at least one priming mechanism comprises a roughened surface on said inner wall.

3. The dispensing pump of claim 2, wherein:

said roughened surface is created by photochemically etching a core used to mold said inner wall.

4. The dispensing pump of claim 1, wherein:

said at least one priming mechanism comprises at least one flat, said at least one flat having a surface defining a chord of said inner wall.

5. The dispensing pump of claim 4, wherein:

a ratio of a diameter of said inner wall to a depth of said at least one flat, measured from said surface defining a chord to a line tangent to said inner wall and parallel to said surface defining a chord, is approximately 600:1 to 300:1.

6. The dispensing pump of claim 4, wherein:

said at least one priming mechanism comprises a plurality of flats.

7. A dispensing pump comprising:

a cylinder, said cylinder comprising an inner wall;

a piston reciprocally mounted in said cylinder, said piston comprising at least one seal sealing against said inner wall, said piston reciprocating in said cylinder from a first, axially outward, position to a second, axially inward, position; and at least one priming mechanism on said cylinder inner wall, said at least one priming mechanism being located at a location of said at least one seal on said inner wall at said second position of said piston, said priming mechanism creating at least one gap between said at least one seal and said inner wall, said at least one gap comprising an obtuse angle.

8. The dispensing pump of claim 7, wherein:

said at least one priming mechanism comprises at least one flat, said at least one flat having a surface defining a chord of said inner wall.

9. The dispensing pump of claim 7, wherein:

said obtuse angle is approximately 162°.

10. A method of venting air from a pump chamber comprising the steps of:

providing a cylinder wherein said cylinder comprises an inner wall;

providing a piston reciprocally mounted in said cylinder wherein said piston comprises at least one seal sealing against said inner wall and wherein said piston reciprocates in said cylinder from a first, axially outward, position to a second, axially inward, position;

providing at least one priming mechanism on said cylinder inner wall;

engaging said at least one seal with said at least one priming mechanism at said second position of said piston;

creating at least one gap between said at least one seal and said inner wall wherein said at least one gap is sufficiently small so that air passes through said at least one gap but a liquid will not pass through said at least one gap; and exhausting air through said at least one gap.

11. The method of claim 10, wherein:

said step of providing at least one priming mechanism comprises the step of producing a roughened surface on said inner wall.

12. The method of claim 11, wherein:

said step of producing a roughened surface comprises the step of photochemically etching a core used to mold said inner wall.

13. The method of claim 10, wherein:

said step of creating at least one gap comprises creating a gap comprising an obtuse angle.

* * * * *